(12) United States Patent
Yao

(10) Patent No.: US 12,235,165 B1
(45) Date of Patent: Feb. 25, 2025

(54) FOOD THERMOMETER AND FOOD TEMPERATURE DETECTION SYSTEM

(71) Applicant: Shanghai Xinqi Electronic Technology Co., Ltd., Shanghai (CN)

(72) Inventor: Guodong Yao, Jiangxi (CN)

(73) Assignee: Shanghai Xinqi Electronic Technology Co., Ltd., Shanghai (CN)

( * ) Notice: Subject to any disclaimer, the term of this patent is extended or adjusted under 35 U.S.C. 154(b) by 0 days.

(21) Appl. No.: 18/644,179

(22) Filed: Apr. 24, 2024

(30) Foreign Application Priority Data

Mar. 18, 2024 (CN) .......................... 202420525431.9

(51) Int. Cl.
G01K 7/00 (2006.01)
G01K 1/024 (2021.01)
G01K 1/08 (2021.01)

(52) U.S. Cl.
CPC .............. G01K 1/024 (2013.01); G01K 1/08 (2013.01); *G01K 7/00* (2013.01); *G01K 2215/00* (2013.01)

(58) Field of Classification Search
CPC ...... G01K 1/024; G01K 1/08; G01K 2215/00; G01K 1/00; G01K 2207/02; H02J 7/0042
See application file for complete search history.

(56) References Cited

U.S. PATENT DOCUMENTS

| 10,024,736 | B2 * | 7/2018 | Nivala ..................... G01K 7/42 |
| 10,670,470 | B2 | 6/2020 | Nivala et al. |
| 11,056,763 | B2 | 7/2021 | Nivala et al. |
| 11,378,462 | B2 * | 7/2022 | Wu .......................... G01K 1/08 |
| 11,506,545 | B2 | 11/2022 | Nivala et al. |
| 11,920,984 | B2 * | 3/2024 | Lion ....................... G01K 1/024 |
| 2007/0067118 | A1 * | 3/2007 | Cooper .................. H02J 7/0042 702/57 |
| 2019/0250044 | A1 * | 8/2019 | Chiu ........................ H04W 4/38 |
| 2019/0339133 | A1 * | 11/2019 | Pulvermacher ........ G01K 1/022 |
| 2020/0129006 | A1 | 4/2020 | Nivala |

(Continued)

FOREIGN PATENT DOCUMENTS

| CN | 110146183 A | * | 8/2019 | ............... G01K 1/00 |
| CN | 109419402 B | * | 12/2021 | ............. A47J 43/28 |

(Continued)

OTHER PUBLICATIONS

18644179_2024-07-02_CN_109419402_B_H.pdf,Dec. 24, 2021.*

(Continued)

*Primary Examiner* — Gail Kaplan Verbitsky

(57) ABSTRACT

A food thermometer includes: a circuit board, a charging assembly, an energy storage element, an insulating member, a first metal housing, and a first temperature detection unit configured to detect a temperature of food. The circuit board is electrically connected to the charging assembly and the energy storage element; and the circuit board, the charging assembly and the energy storage element are disposed on one side of the insulating member. The first metal housing is electrically connected to the circuit board and is disposed on the other side of the insulating member. The first temperature detection unit is electrically connected to the circuit board to transmit a temperature signal to the circuit board, and the first metal housing is configured to transmit the temperature signal, as a wireless signal, to an external terminal.

17 Claims, 6 Drawing Sheets

(56) References Cited

U.S. PATENT DOCUMENTS

| | | |
|---|---|---|
| 2022/0049992 A1 | 2/2022 | Nivala et al. |
| 2023/0288264 A1 * | 9/2023 | Pulvermacher .......... G01K 1/00 |

FOREIGN PATENT DOCUMENTS

| | | | | |
|---|---|---|---|---|
| CN | 215524878 U | * | 1/2022 | ............. A47J 36/06 |
| CN | 217466027 U | * | 9/2022 | ............. G01K 1/08 |
| CN | 117109755 A | * | 11/2023 | |
| CN | 118190190 A | * | 6/2024 | |
| EP | 3855142 A1 | * | 7/2021 | ............. G01K 1/024 |
| JP | H08292270 A | * | 11/1996 | |
| WO | WO-2018037174 A1 | * | 3/2018 | ............. A47J 37/067 |
| WO | WO-2019012324 A1 | * | 1/2019 | ............. G01K 1/024 |
| WO | WO-2021137118 A1 | * | 7/2021 | ............. G01K 1/024 |

OTHER PUBLICATIONS

18644179_2024-07-02_CN_118190190_A_H.pdf,Jun. 14, 2024.*
18644179_2024-07-02_CN_215524878_U_H.pdf,Jan. 14, 2022.*
18644179_2024-07-02_WO_2018037174_A1_H.pdf,Mar. 1, 2018.*
18644179_2024-07-02_WO_2019012324_A1_H.pdf,Jan. 17, 2019.*
18644179_2024-07-02_WO_2021137118_A1_H.pdf, Jul. 8, 2021.*
18644179_2024-07-03_CN_110146183_A_H.pdf,Aug. 20, 2019.*
18644179_2024-07-03_CN_117109755_A_H.pdf,Nov. 24, 2023.*
18644179_2024-07-03_CN_217466027_U_H.pdf,Sep. 20, 2022.*
18644179_2024-07-03_EP_3855142_A1_H.pdf,Jul. 28, 2021.*
18644179_2024-08-15_JP_H08292270_A_H.pdf, Nov. 5, 1996.*

* cited by examiner

FOOD THERMOMETER AND FOOD TEMPERATURE DETECTION SYSTEM

CROSS REFERENCE TO RELATED APPLICATION

The present application claims priority of the Chinese patent application No. 2024205254319, filed on Mar. 18, 2024, and contents of which are incorporated herein by its entireties.

TECHNICAL FIELD

The present disclosure relates to the field of thermometers, and in particular to a food thermometer and a food temperature detection system.

BACKGROUND

As living standards improve, people have increasingly higher requirements for food. A temperature of food, such as steak, is closely related to a taste and nutrition thereof. When grilling and cooking the food, in order to ensure the food to have an ideal taste, the temperature of the food needs to be detected in real time, and a food thermometer is developed accordingly. During cooking the food, a user inserts the food thermometer into a to-be-cooked food. The food thermometer transmits, through an antenna of the thermometer, a temperature signal as a wireless signal to a user terminal, such that the user obtains an internal temperature of the food in real time during cooking.

In the art, the food thermometer usually includes a ceramic housing, a circuit board, an antenna, a temperature sensor, and an energy storage element. The circuit board, the antenna, the temperature sensor, and the energy storage element are arranged inside the ceramic housing. The antenna, the temperature sensor, and the energy storage element are electrically connected to the circuit board. An external power supply charges the energy storage element through the circuit board.

However, in the above-described technical solution, transmission of the wireless signal of the antenna may be easily interfered by a charging signal for the energy storage element, and therefore, the transmission is unstable.

SUMMARY OF THE DISCLOSURE

In a first aspect, the present disclosure provides a food thermometer, including: a circuit board, a charging assembly, an energy storage element, an insulating member, a first metal housing, and a first temperature detection unit configured to detect a temperature of food. The circuit board is electrically connected to the charging assembly and the energy storage element; and the circuit board, the charging assembly and the energy storage element are disposed on one side of the insulating member. The first metal housing is electrically connected to the circuit board and is disposed on the other side of the insulating member. The first temperature detection unit is electrically connected to the circuit board to transmit a temperature signal to the circuit board, and the first metal housing is configured to transmit the temperature signal, as a wireless signal, to an external terminal.

In a second aspect, the present disclosure provides a food temperature detection system, including a relay device and the food thermometer of the first aspect. The relay device is communicatively connected to the first metal housing of the food thermometer and transmits the temperature signal from the first metal housing to the external terminal, the relay device is electrically connected to the charging assembly of the food thermometer.

BRIEF DESCRIPTION OF THE DRAWINGS

Technical solution of the present disclosure will be described in further detail in the following by referring to the accompanying drawings and embodiments.

Figure 1:
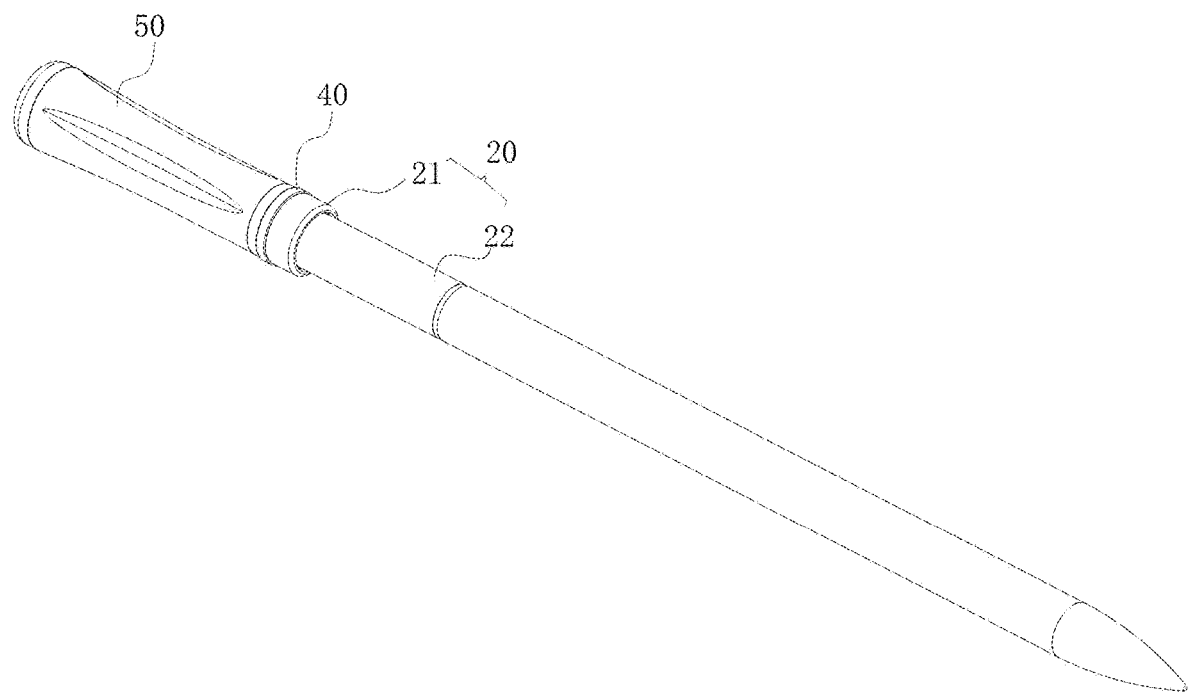
FIG. 1 is a perspective schematic view of a food thermometer according to an embodiment of the present disclosure.

REFERENCE NUMERALS IN THE DRAWINGS 10, circuit board; 20, charging assembly; 21, second conductive member; 22, second metal housing; 23, third conductive member; 24, first conductive pin; 25, second conductive pin; 30, energy storage element; 31, battery; 311, heat-insulating adhesive; 40, insulating member; 410, through hole; 420, receiving slot; 41, first mounting portion; 42, isolation portion; 43, second mounting portion; 431, a first mounting protrusion; 432, second mounting protrusion; 433, limiting protrusion; 50, first metal housing; 60, first temperature detection unit; 70, second temperature detection unit; 80, first conductive member;
200, relay device; 210, electrical connection end.

DETAILED DESCRIPTION

To be noted that embodiments and features in the embodiments of the present disclosure may be combined with each other without conflict. Preferred embodiments of the present disclosure will be described in detail by referring to the accompanying drawings.

The present disclosure provides a food thermometer 100, as shown in FIG. 1 to FIG. 4, the food thermometer 100 includes a circuit board 10, a charging assembly 20, an energy storage element 30, an insulating member 40, a first metal housing 50, and a first temperature detection unit 60 for detecting a temperature of food.

The circuit board 10 is electrically connected to the charging assembly 20 and the energy storage element 30.

The circuit board 10, the charging assembly 20 and the energy storage element 30 are disposed on one side of the insulating member 40.

The first metal housing 50 is electrically connected to the circuit board 10 and is disposed on the other side of the insulating member 40.

The first temperature detection unit 60 is electrically connected to the circuit board 10 to transmit a temperature signal to the circuit board 10, and the temperature signal is transmitted, as a wireless signaling through the first metal housing 50, to an external terminal.

In the present disclosure, the first metal housing 50 for transmitting the wireless signal is disposed on one side of the insulating member 40, and the circuit board 10, the charging assembly 20, and the energy storage element 30 for charging the food thermometer 100 are disposed on the other side of the insulating member 40. In this way, transmission of the wireless signal and transmission of the charging signal are separated from each other, interference on the transmission of the wireless signal caused by the charging signal is reduced, and stability of the transmission of the wireless signal is improved. In addition, since the first metal housing 50 is directly configured as an antenna for transmitting the wireless signal, compared to the technical solution in which the antenna is configured in a ceramic housing, attenuation of the wireless signal is reduced, and a transmission effect of the wireless signal is improved.

Figure 2:
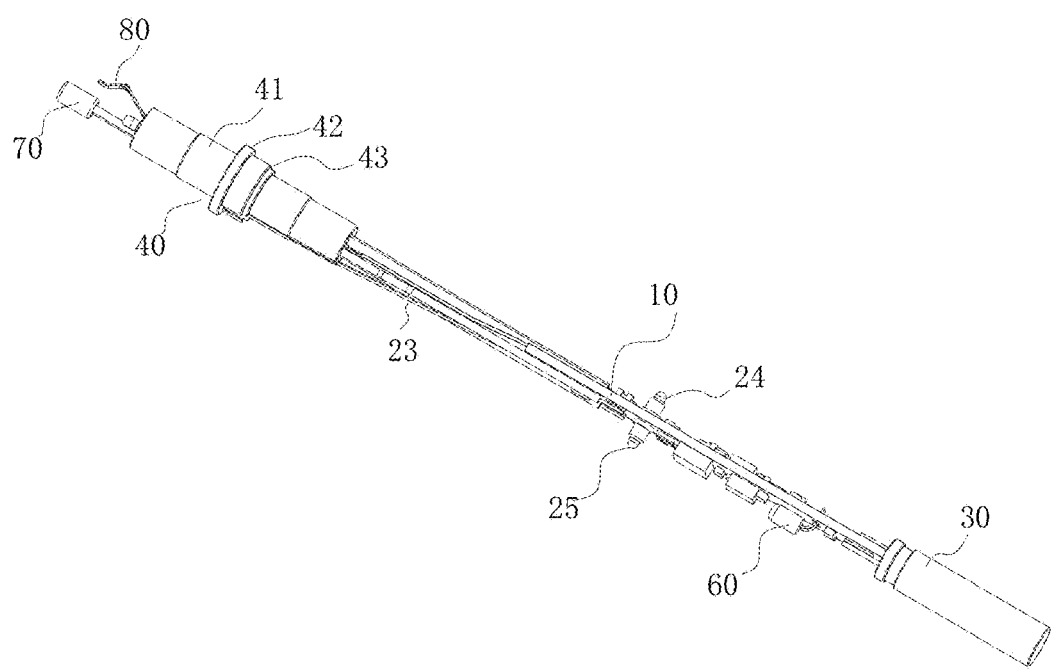
FIG. 2 is a perspective schematic view of the food thermometer, in which a first metal housing and a second metal housing are omitted, according to an embodiment of the present disclosure.
Figure 3:
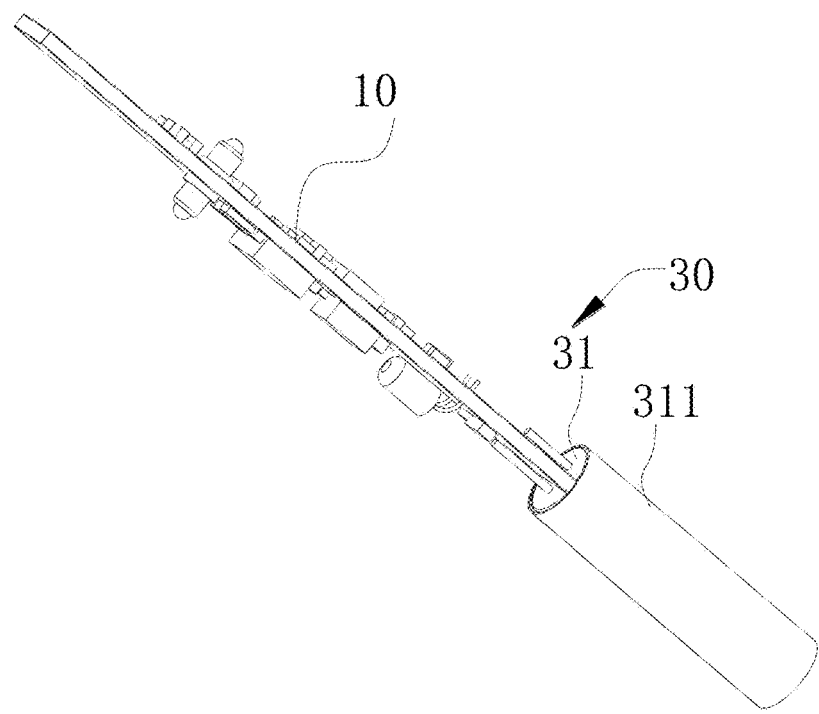
FIG. 3 is a perspective schematic view of a state in which an energy storage element is electrically connected to a circuit board according to an embodiment of the present disclosure.

As shown in FIG. 1 to FIG. 3, the energy storage element 30 supplies power to the circuit board 10, and an external power supply is electrically connected to the charging assembly 20 to charge the energy storage element 30 via the charging assembly 20 and the circuit board 10. The energy storage element 30 may specifically be a battery, a supercapacitor, or the like that can store electrical energy. In the present embodiment, a battery 31 is configured as the energy storage element 30. An outer periphery of the battery 31 is wrapped with a heat-insulating adhesive 311 for insulating heat to extend a service life of the battery 31.

The insulating member 40 may be made of any one of: ceramic, silicone and ceramic fiber. In the present embodiment, the insulating member 40 is made of ceramic. Specifically, the insulating member 40 may be made of black ceramic. The black ceramic is resistant to high temperatures, heat, and corrosion.

The first temperature detection unit 60 may detect the temperature of the food. Specifically, the first temperature detection unit 60 may specifically be a temperature sensor. The temperature sensor is disposed on and electrically connected to the circuit board 10. A specific location at which the temperature sensor is disposed on the circuit board 10 may be determined according to demands. The temperature sensor detects and obtains the temperature of the food and transmits the temperature signal to the circuit board 10. A relevant circuit on the circuit board 10 processes the temperature signal, and the circuit board 10 transmits the processed signal, as the wireless signal through the first metal housing 50, to the external terminal. The external terminal may be a mobile phone, a tablet, a laptop computer, and so on, and the user obtains the temperature of the food in real time through the terminal.

Furthermore, the food thermometer 100 further includes a second temperature detection unit 70 configured to detect a temperature of an environment. The second temperature detection unit 70 is electrically connected to the circuit board 10 to transmit a temperature signal of the environment to the circuit board 10, and the temperature signal of the environment is transmitted, as a wireless signal through the first metal housing 50, to the external terminal. The second temperature detection unit 70 detects the temperature of the environment, such as a temperature inside a cooking appliance such as an oven, a grill, and so on. The second temperature detection unit 70 may also be a temperature sensor. Specifically, the second temperature detection unit 70 may be arranged inside the first metal housing 50, and is electrically connected to the circuit board 10 via a connecting wire. A relevant circuit on the circuit board 10 processes the temperature signal of the environment, and the processed signal is transmitted as the wireless signal through the first metal housing 50.

Figure 4:
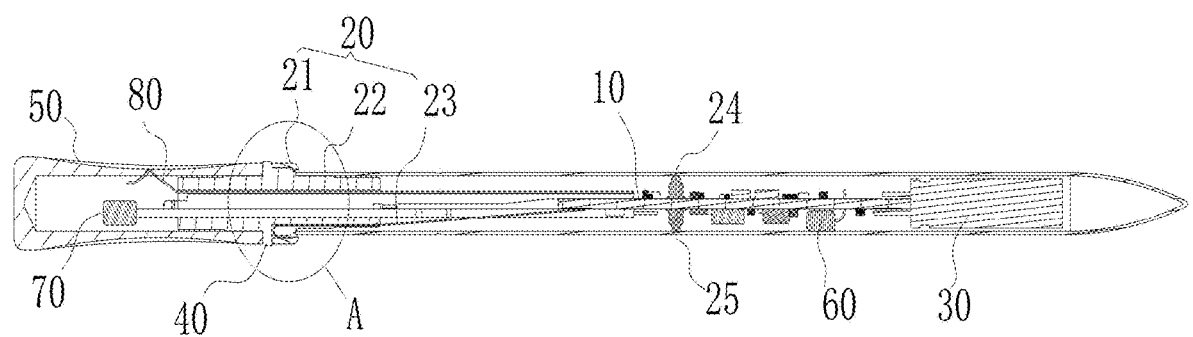
FIG. 4 is a cross-sectional view of the food thermometer according to an embodiment of the present disclosure.
Figure 6:
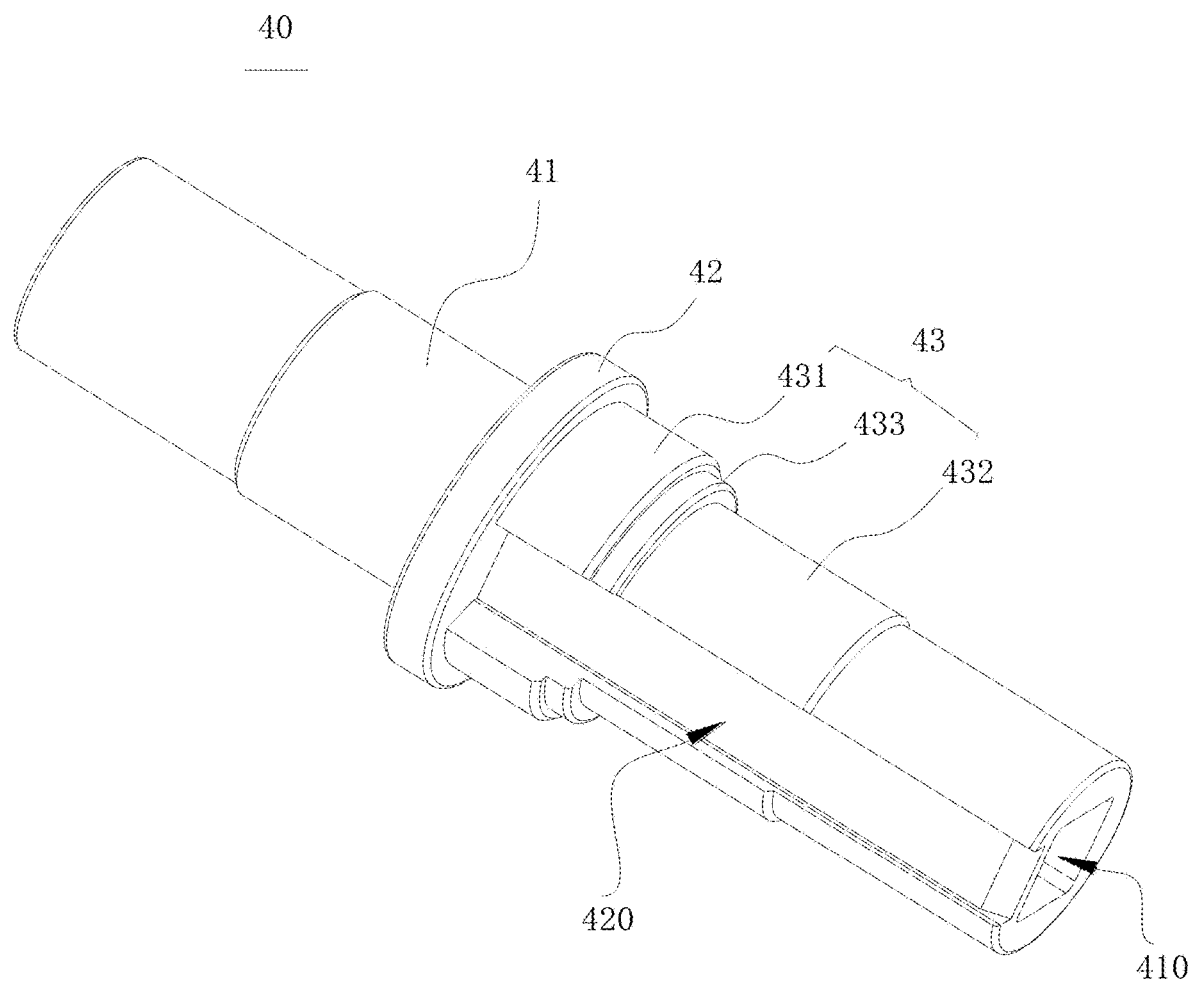
FIG. 6 is a perspective schematic view of an insulating member according to an embodiment of the present disclosure.

As shown in FIG. 2, FIG. 4, and FIG. 6, in the present embodiment, the insulating member 40 defines a through hole 410. The food thermometer 100 further includes a first conductive member 80 extending through the through hole 410. An end of the first conductive member 80 is electrically connected to the circuit board 10, and the other end is electrically connected to the first metal housing 50.

By defining the through hole 410 in the insulating member 40 to allow the first conductive member 80 to extend through, the first metal housing 50 and the circuit board 10, which are respectively disposed on two sides of the insulating member 40, are electrically connected to each other, and the structure of the device is compact.

The first conductive member 80 may be strip-shaped, sheet-shaped or irregularly shaped. In the present embodiment, the first conductive member 80 may be a sheet-shaped conductive elastic sheet. The conductive elastic sheet extends through the through hole 410. An end of the conductive elastic sheet is electrically connected to the circuit board 10, and the other end elastically abuts against the first metal housing 50 to be electrically connected to the first metal housing 50. The conductive elastic sheet has certain elasticity and flexibility to allow a small change in a distance between components. In this way, the first metal housing 50 and the circuit board 10 are always electrically connected to each other, improving stability of the electrical connection.

Figure 5:
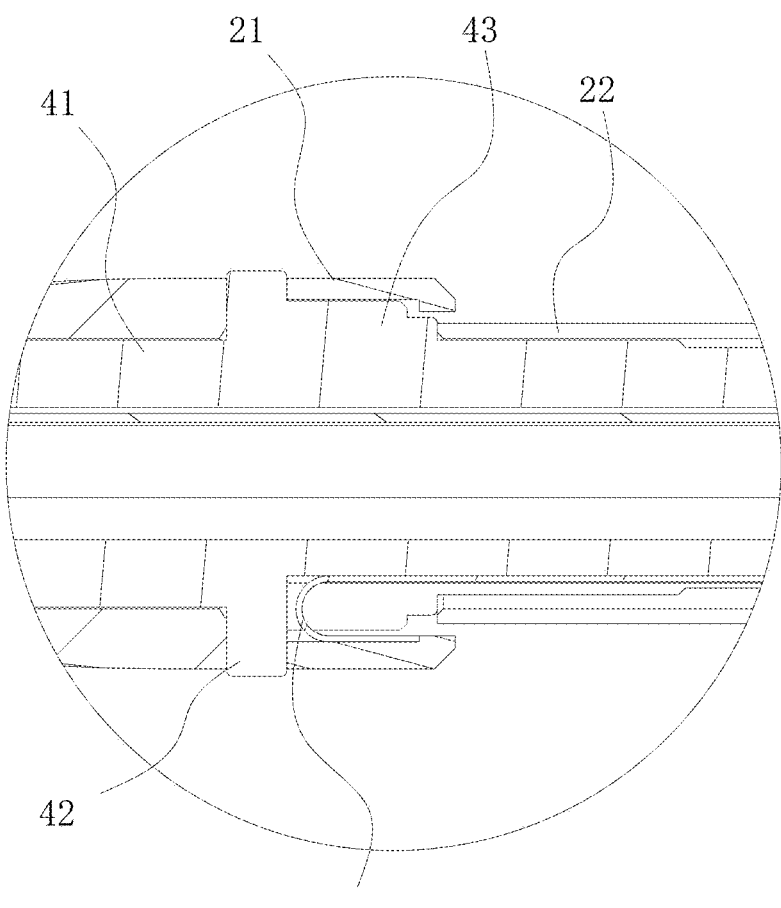
FIG. 5 is an enlarged view of a portion A in FIG. 4

As shown in FIG. 4 and FIG. 5, in the present embodiment, the charging assembly 20 includes a second conductive member 21 and a second metal housing 22 that are respectively electrically connected to two electrical poles of the circuit board 10. The energy storage element 30, the circuit board 10, and the first temperature detection unit 60 are all arranged inside the second metal housing 22.

The external power supply is electrically connected to the circuit board 10 via the second conductive member 21 and the second metal housing 22 to charge the energy storage element 30. One of the second conductive member 21 and the second metal housing 22 serves as a charging positive pole, and the other one of the second conductive member 21 and the second metal housing 22 serves as a charging negative pole. In some embodiments, the second conductive member 21 is the charging negative pole and is electrically connected to the negative electrical pole of the circuit board 10; and the second metal housing 22 is the charging positive pole and is electrically connected to the positive electrical pole of the circuit board 10.

The second metal housing 22 serves as a protective housing for the energy storage element 30, the circuit board 10, and the first temperature detection unit 60. In addition, the second metal housing 22 also serves as a conductive end that connects the circuit board 10 to the external power supply. The second metal housing 22 has a large area to improve, to some extent, reliability and stability of the electrical connection between the first metal housing 50 and the external power supply and the electrical connection between the first metal housing 50 and the internal circuit board 10. Further, the large area of the second metal housing 22 facilitates heat dissipation during a charging process, extending the service life of the food thermometer 100.

When the food thermometer 100 is being in use, the user inserts the second metal housing 22 of the food thermometer 100 into the food, such as a steak, and the first temperature detection unit 60 detects and obtains the temperature of the food. Specifically, in practice, an end of the second metal housing 22 away from the insulating member 40 may be configured as a tip, such that the second metal housing 22 may be inserted into the food easily.

In other embodiments, as the electrical connection end of the circuit board 10 that is electrically connected to the external power supply, the charging assembly 20 may include two electrically conductive terminals that are electrically connected to the circuit board 10. The two electrically conductive terminals are disposed on one side of the insulating member 40 through a ceramic housing, such that the two electrically conductive terminals are separated from the first metal housing 50. The external power supply is electrically connected to the circuit board 10 through the two electrically conductive terminals to charge the energy storage element 30.

As shown in FIG. 4 to FIG. 6, in the present embodiment, the insulating member 40 includes a first mounting portion 41, an isolation portion 42, and a second mounting portion 43. The isolation portion 42 is disposed between the first mounting portion 41 and the second mounting portion 43. The first mounting portion 41 is at least partially arranged in first metal housing 50. The second metal housing 22 and the second conductive member 21 are spaced apart from each other and both sleeve the second mounting portion 43.

In the present embodiment, the first mounting portion 41 and the second mounting portion 43 are arranged on two sides of the isolation portion 42 respectively, at least a portion of the first mounting portion 41 is arranged in the first metal housing 50 for transmitting the wireless signal, and the second metal housing 22 and the second conductive member 21 for charging are attached to the second mounting portion 43. In this way, wireless signal transmission and charging of the energy storage element 30 are separated from each other, the interference on the wireless signal transmission caused by the charging signal is reduced, and stability of the wireless signal transmission is improved. According to the above configuration, the first metal housing 50, the second metal housing 22, and the second conductive member 21 may be assembled easily.

The second conductive member 21 may be a conductive metal ring. The metal ring is attached to the second mounting portion 43.

Further, the charging assembly 20 further includes a third conductive member 23. The second mounting portion 43 defines a receiving slot 420. The third conductive member 23 is received in the receiving slot 420. An end of the third conductive member 23 is electrically connected to the circuit board 10, and the other end is electrically connected to the second conductive member 21.

The second conductive member 21 and the second metal housing 22 are both attached to the second mounting portion 43. Since the third conductive member 23 is received in the receiving slot 420, the second conductive member 21 is electrically connected to the circuit board 10 and is prevented from being short-circuited with the second metal housing 22. In this way, the structure related to the charging assembly 20 and the insulating member 40 is ingenious and compact.

Specifically, the third conductive member 23 may be strip shaped, sheet shaped, and the like. In the present embodiment, the third conductive member 23 may be a sheet-shaped conductive elastic sheet and elastically abuts against the second conductive member 21. The conductive elastic sheet is received in the receiving slot 420. The conductive elastic sheet has certain elasticity and flexibility to allow for a small change in the distance between components. In this way, the second conductive member 21 and the circuit board 10 are always electrically connected to each other, improving stability of the electrical connection therebetween. The third conductive member 23 may be electrically connected to the second conductive member 21 by spot welding, such that the electrical connection is more stable.

As shown in FIG. 1 to FIG. 4, the charging assembly 20 further includes at least one conductive pin disposed on the circuit board 10. The conductive pin abuts against the second metal housing 22 to enable the circuit board 10 to be electrically connected to the second metal housing 22.

The conductive pin has certain elasticity and may elastically abut against the second metal housing 22 to be electrically connected with the second metal housing 22. The elastically allows a small change in the distance between the circuit board 10 and the second metal housing 22. In this way, the circuit board 10 and the second metal housing 22 may always be electrically connected to each other, improving the stability of the electrical connection.

The number of conductive pins may be one, two or more than two, which may be determined by the user according to demands. In some embodiments, a first conductive pin 24 and a second conductive pin 25 are arranged on the circuit board 10. The first conductive pin 24 and the second conductive pin 25 are symmetrically arranged with each other and are respectively arranged on a front side and a rear side of the circuit board 10. The first conductive pin 24 and/or the second conductive pin 25 abuts against the second metal housing 22 to enable the circuit board 10 to be electrically connected to the second metal housing 22.

When assembling the circuit board 10 to the second metal housing 22, it may be more difficult to ensure that the circuit board 10 is disposed at a center inside the second metal housing 22. Therefore, the first conductive pin 24 and the second conductive pin 25 are symmetrically arranged on the front side and the rear side of the circuit board 10, such that the circuit board 10 is electrically connected to the second metal housing 22 through the first conductive pin 24 or the second conductive pin 25, or through the first conductive pin 24 and the second conductive pin 25. In this way, the circuit board 10 is ensured to be always electrically connected to the second metal housing 22 through the conductive pin, improving the stability and reliability of the electrical connection between the circuit board 10 and the second metal housing 22.

As shown in FIG. 2, FIG. 4, FIG. 5, and FIG. 6, in the present embodiment, the second mounting portion 43 includes a first mounting protrusion 431 and a second mounting protrusion 432. The second mounting protrusion 432 is protruding from an end surface of the first mounting protrusion 431. The second mounting protrusion 432 and the first mounting protrusion 431 are coaxial with each other. The second conductive member 21 is attached to the first mounting protrusion 431, and the second metal housing 22 is attached to the second mounting protrusion 432. A gap is formed between the second conductive member 21 and the second metal housing 22.

Since the second conductive member 21 is attached to the first mounting protrusion 431 and the second metal housing 22 is attached to the second mounting protrusion 432, the second metal housing 22 and the second conductive member 21 are spaced apart from each other and are prevented from being short circuited with each other due to contact.

Further, the second mounting portion 43 further includes a limiting protrusion 433 protruding from an end surface of the first mounting protrusion 431. The limiting protrusion 433 abuts against the second metal housing 22 to limit a depth of the second metal housing 22 sleeving the second mounting protrusion 432.

By arranging the limiting protrusion 433 to abut against the second metal housing 22, an attaching length or area between the second metal housing 22 and the second mounting protrusion 432 is limited, such that the second metal housing 22 may be mounted to a proper position.

In some embodiments, the first mounting protrusion 431, the limiting protrusion 433, and the second mounting protrusion 432 are three cylinders that are coaxial with each other. A diameter of the limiting protrusion 433 is less than a diameter of the first mounting protrusion 431, and a diameter of the second mounting protrusion 432 is less than the diameter of the limiting protrusion 433. The receiving slot 420 that receives the third conductive member 23 extends from the first mounting protrusion 431, passing through the limiting protrusion 433, to further reach the second mounting protrusion 432. In other embodiments, the first mounting protrusion 431, the limiting protrusion 433, and the second mounting protrusion 432 may be a columnar structure having a cross section of other shapes, such as a square, a rectangle, and the like.

The first mounting portion 41 may be a cylinder, and the first metal housing 50 sleeves the first mounting portion 41.

Figure 7:
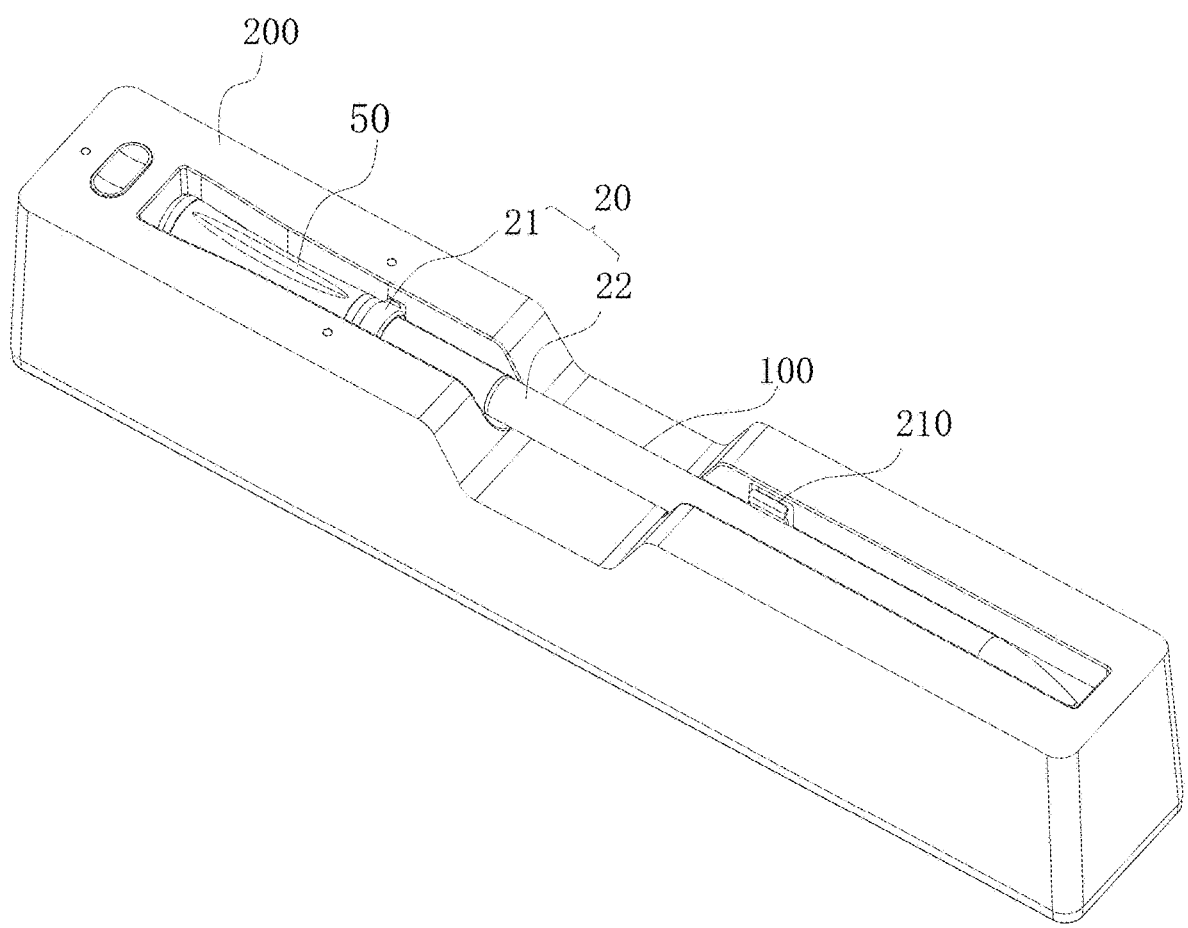
FIG. 7 is a perspective schematic view of a food temperature detection system (the food thermometer electrically connected to a relay device) according to an embodiment of the present disclosure.
Figure 8:
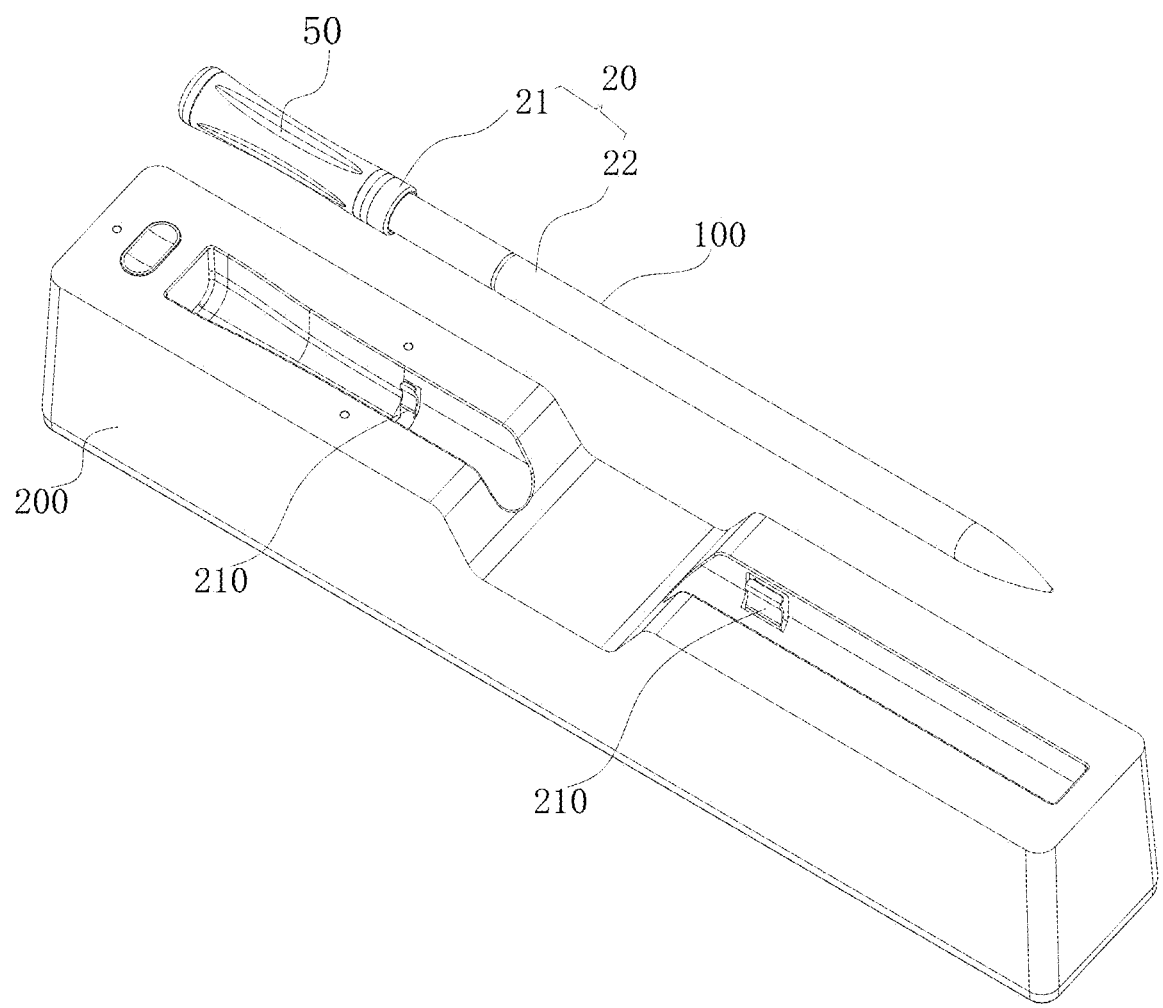
FIG. 8 is a perspective schematic view of the food temperature detection system (food thermometer electrically disconnected from the relay device) according to an embodiment of the present disclosure.

As shown in FIG. 1, FIG. 7 and FIG. 8, the present disclosure further provides a food temperature detection system. The food temperature detection system includes a relay device 200 and the food thermometer 100 as described above. The relay device 200 is communicatively connected to the first metal housing 50 of the food thermometer 100 and transmits the temperature signal from the first metal housing 50 to the external terminal. The relay device 200 may be electrically connected to the charging assembly 20 of the food thermometer 100.

According to the present disclosure, the first metal housing 50 for transmitting the wireless signal is disposed on one side of the insulating member 40, and the circuit board 10, the charging assembly 20, and the energy storage element 30 for charging the food thermometer 100 are disposed on the other side of the insulating member 40. In this way, transmission of the wireless signal and transmission of the charging signal are separated from each other, the interference on the transmission of the wireless signal caused by the charging signal is reduced, and stability of the transmission of the wireless signal is improved. In addition, since the first metal housing 50 is directly configured as the antenna for transmitting the wireless signal, compared to the technical solution in which the antenna is configured in a ceramic housing, attenuation of the wireless signal is reduced, and a transmission effect of the wireless signal is improved.

In the food temperature detection system, the relay device 200 is configured as a relay station for signal transmission between the food thermometer 100 and the external terminal, such as a mobile phone, remote transmission of the signal from the food thermometer 100 is achieved. In addition, the relay device 200 may be electrically connected to the charging assembly of the food thermometer 100 to charge the energy storage element through the charging assembly of the food thermometer 100.

Specifically, as shown in FIG. 7 and FIG. 8, the relay device 200 may be arranged with an electrical connection end 210. The electrical connection end 210 is electrically connected to the charging assembly 20 of the food thermometer 100 to charge the energy storage element 30 thereof. When the food thermometer 100 needs to be charged, the charging assembly 20 of the food thermometer 100 may be electrically connected to the electrical connection end 210 of the relay device 200. When the food thermometer 100 needs to be used to detect the temperature of the food or the food thermometer 100 is fully charged, the charging assembly 20 of the food thermometer 100 may be electrically disconnected from the electrical connection end 210 of the relay device 200.

It should be understood that the above embodiments only illustrate technical solutions of the present disclosure, but does not limit the present disclosure. Any ordinary skilled person in the art may perform modification or equivalent replacement on the above embodiments or some technical features of the embodiments. All the modifications and replacements shall fall within the scope of the appended claims of the present disclosure.

What is claimed is:

1. A food thermometer, comprising: a circuit board, a charging assembly, an energy storage element, an insulating member, a first metal housing, and a first temperature detection unit configured to detect a temperature of food, wherein,
    the circuit board is electrically connected to the charging assembly and the energy storage element; and the circuit board, the charging assembly and the energy storage element are disposed on one side of the insulating member;
    the first metal housing is electrically connected to the circuit board and is disposed on the other side of the insulating member;
    the first temperature detection unit is electrically connected to the circuit board to transmit a temperature signal to the circuit board, and the first metal housing is configured to transmit the temperature signal, as a wireless signal, to an external terminal;
    wherein, the charging assembly comprises a second conductive member and a second metal housing, one of the second conductive member and the second metal housing is electrically connected to one of two electrical poles of the circuit board, and the other one of the second conductive member and the second metal housing is electrically connected to the other one of two electrical poles of the circuit board; and the energy storage element, the circuit board and the first temperature detection unit are arranged inside the second metal housing; and
    the insulating member comprises a first mounting portion, an isolation portion and a second mounting portion; the isolation portion is disposed between the first mounting portion and the second mounting portion; the first mounting portion is at least partially arranged in the first metal housing; the second metal housing and the second conductive member are spaced apart from each other and both attached to an outer surface of the second mounting portion.

2. The food thermometer according to claim 1, wherein, the insulating member defines a through hole, the food thermometer further comprises a first conductive member that extends through the through hole, an end of the first conductive member is electrically connected to the circuit board, and the other end of the first conductive member is electrically connected to the first metal housing.

3. The food thermometer according to claim 1, wherein, the charging assembly further comprises a third conductive member; the second mounting portion defines a receiving slot, the third conductive member is received in the receiving slot; an end of the third conductive member is electrically connected to the circuit board, and the other end of the third conductive member is electrically connected to the second conductive member.

4. The food thermometer according to claim 3, wherein, the second mounting portion comprises a first mounting protrusion and a second mounting protrusion; the second mounting protrusion protruding from an end face of the first mounting protrusion; the second mounting protrusion and the first mounting protrusion are coaxial with each other; the second conductive member is attached to the first mounting protrusion; the second metal housing is attached to the second mounting protrusion; and a gap is defined between the second conductive member and the second metal housing.

5. The food thermometer according to claim 4, wherein, the second mounting portion further comprises a limiting protrusion protruding from an end face of the first mounting protrusion; the limiting protrusion abuts against the second metal housing to limit a length of the second metal housing being attached to the second mounting protrusion.

6. The food thermometer according to claim 1, wherein, the charging assembly further comprises at least one conductive pin disposed on the circuit board, the conductive pin abuts against the second metal housing to enable the circuit board to be electrically connected to the second metal housing.

7. The food thermometer according to claim 6, wherein, the at least one conductive pin comprises a first conductive pin and a second conductive pin; the first conductive pin and second conductive pin are disposed symmetrically with each other and are arranged respectively on a front side and on a rear side of the circuit board; at least one of the first conductive pin and the second conductive pin abuts against the second metal housing to enable the circuit board to be electrically connected to the second metal housing.

8. A food temperature detection system, comprising a relay device and a food thermometer, wherein, the food thermometer comprises: a circuit board, a charging assembly, an energy storage element, an insulating member, a first metal housing, and a first temperature detection unit configured to detect a temperature of food;
the circuit board is electrically connected to the charging assembly and the energy storage element; and the circuit board, the charging assembly and the energy storage element are disposed on one side of the insulating member;
the first metal housing is electrically connected to the circuit board and is disposed on the other side of the insulating member;
the first temperature detection unit is electrically connected to the circuit board to transmit a temperature signal to the circuit board, and the first metal housing is configured to transmit the temperature signal, as a wireless signal, to an external terminal;
the relay device is communicatively connected to the first metal housing of the food thermometer and transmits the temperature signal from the first metal housing to the external terminal, the relay device is configured for charging the charging assembly of the food thermometer;
wherein, the charging assembly comprises two conductive members connected to two electrical poles of the circuit board; and
the insulating member comprises a first mounting portion, an isolation portion and a second mounting portion; the isolation portion is disposed between the first mounting portion and the second mounting portion; at least a portion of the first mounting portion is arranged in the first metal housing; the two conductive members are spaced apart from each other and both attached to the second mounting portion.

9. The food temperature detection system according to claim 8, wherein, the insulating member defines a through hole, the food thermometer further comprises a first conductive member that extends through the through hole, an end of the first conductive member is electrically connected to the circuit board, and the other end of the first conductive member is electrically connected to the first metal housing.

10. The food temperature detection system according to claim 8, wherein, the two conductive members are a second conductive member and a second metal housing, one of the second conductive member and the second metal housing is electrically connected to one of the two electrical poles of the circuit board, and the other one of the second conductive member and the second metal housing is electrically connected to the other one of the two electrical poles of the circuit board; and the energy storage element, the circuit board and the first temperature detection unit are arranged inside the second metal housing.

11. The food temperature detection system according to claim 8, wherein, the charging assembly further comprises a third conductive member; the second mounting portion defines a receiving slot, the third conductive member is received in the receiving slot; an end of the third conductive member is electrically connected to the circuit board, and the other end of the third conductive member is electrically connected to the second conductive member.

12. The food temperature detection system according to claim 11, wherein, the second mounting portion comprises a first mounting protrusion and a second mounting protrusion; the second mounting protrusion protruding from an end face of the first mounting protrusion; the second mounting protrusion and the first mounting protrusion are coaxial with each other; the second conductive member is attached to the first mounting protrusion; the second metal housing is attached to the second mounting protrusion; and a gap is defined between the second conductive member and the second metal housing.

13. The food temperature detection system according to claim 12, wherein, the second mounting portion further comprises a limiting protrusion protruding from an end face of the first mounting protrusion; the limiting protrusion abuts against the second metal housing to limit a depth of the second metal housing sleeving the second mounting protrusion.

14. The food temperature detection system according to claim 10, wherein, the charging assembly further comprises at least one conductive pin disposed on the circuit board, the conductive pin abuts against the second metal housing to enable the circuit board to be electrically connected to the second metal housing.

15. The food temperature detection system according to claim 14, wherein, the at least one conductive pin comprises a first conductive pin and a second conductive pin; the first conductive pin and second conductive pin are disposed symmetrically with each other and are arranged respectively on a front side and on a rear side of the circuit board; at least one of the first conductive pin and the second conductive pin abuts against the second metal housing to enable the circuit board to be electrically connected to the second metal housing.

16. A food thermometer, comprising: a circuit board, a charging assembly, an energy storage element, an insulating member, a first metal housing, and a first temperature detection unit configured to detect a temperature of food, wherein, the circuit board is electrically connected to the charging assembly and the energy storage element; and the circuit board, the charging assembly and the energy storage element are disposed on one side of the insulating member;

the first metal housing is electrically connected to the circuit board and is disposed on the other side of the insulating member opposite to the one side of the insulating member;

the first temperature detection unit is electrically connected to the circuit board to transmit a temperature signal to the circuit board, and the first metal housing serves as an antenna configured to wirelessly transmit the temperature signal to an external terminal.

17. The food thermometer according to claim 16, wherein, the charging assembly comprises two conductive members configured to supply power to the circuit board;

the insulating member comprises a first mounting portion, an isolation portion and a second mounting portion; the isolation portion is disposed between the first mounting portion and the second mounting portion; the two conductive members are connected to a portion of the second mounting portion and extending away from the first mounting portion; the first mounting portion is at least partially arranged in the first metal housing.

\* \* \* \* \*